United States Patent
Pascuzzo

(10) Patent No.: US 10,206,337 B1
(45) Date of Patent: Feb. 19, 2019

(54) TREE SUPPORT SYSTEM AND METHOD

(71) Applicant: Thomas P. Pascuzzo, Lake Worth, FL (US)

(72) Inventor: Thomas P. Pascuzzo, Lake Worth, FL (US)

( * ) Notice: Subject to any disclaimer, the term of this patent is extended or adjusted under 35 U.S.C. 154(b) by 24 days.

(21) Appl. No.: 14/966,452

(22) Filed: Dec. 11, 2015

Related U.S. Application Data

(63) Continuation-in-part of application No. 14/195,163, filed on Mar. 3, 2014, now abandoned.

(51) Int. Cl.
*A01G 17/00* (2006.01)
*A01G 17/14* (2006.01)

(52) U.S. Cl.
CPC .................................... *A01G 17/14* (2013.01)

(58) Field of Classification Search
CPC .......... A01G 17/04; A01G 17/14; A01G 9/12; A01G 9/122; A01G 9/124
USPC ............................................. 47/40.5, 42, 43
See application file for complete search history.

(56) References Cited

U.S. PATENT DOCUMENTS

| | | | |
|---|---|---|---|
| 2,501,255 A | 5/1946 | Bell | |
| 4,520,590 A | 6/1985 | Schuh | |
| 5,402,600 A | 4/1995 | Tompkins | |
| 5,590,865 A | 1/1997 | Odom, Jr. | |
| 5,950,359 A | 9/1999 | Pivnik | |
| 6,370,817 B1 | 4/2002 | Brooks et al. | |
| 6,612,071 B1 | 9/2003 | Steadman | |
| 8,407,934 B1 | 4/2013 | Solares | |
| D762,399 S * | 8/2016 | Sorrick | D6/582 |
| 2009/0119984 A1 | 5/2009 | Nabhan | |

FOREIGN PATENT DOCUMENTS

JP          2005211399      *  8/2005

* cited by examiner

*Primary Examiner* — Monica L Williams
*Assistant Examiner* — Aaron M Rodziwicz
(74) *Attorney, Agent, or Firm* — Mark D. Bowen; Malin Haley DiMaggio & Bowen, P.A.

(57) ABSTRACT

A tree support system and method for temporarily supporting a tree that is easy to install and remove, and does not impart damage to the tree. A plurality of one-piece molded support blocks which are designed to be strapped to the trunk of a tree encircling the trunk. Each support block is specifically configured to avoid causing damage to the tree by including a padded tree-engaging surface to protect the tree from damage, and a pair of strap-receiving loops which are disposed on the block so as to be spaced from the tree trunk such that securing straps are maintained in spaced relation from the tree trunk. The support blocks further include an angled cavity having a generally rectangular cross-section sized for receiving a wooden support post or leg, such as a 2×4, thereby ensuring proper angled positioning of the support posts.

9 Claims, 12 Drawing Sheets

TREE SUPPORT SYSTEM AND METHOD

CROSS REFERENCE TO RELATED APPLICATIONS

This application is a continuation-in-part of U.S. patent application Ser. No. 14/195,163, filed on Mar. 3, 2014.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates generally to tree planting apparatus, and more particularly to a support apparatus and method of supporting newly planted trees.

2. Description of Related Art

Support systems are often employed to provide temporary support for newly planted trees. Such systems typically include a number of support blocks secured around the trunk of the tree by straps, and legs or posts (e.g. 2×4 or 4×4) connected to the blocks and extending downward at a predetermined angle to the ground. Basic tree support systems use simple blocks of wood strapped around the tree with 2×4 posts nailed to the blocks. The installation of basic tree support systems is known to be time consuming and often resulting in improper installation that renders the system ineffective and/or likely to damage the supported tree. In addition, workers often install the support systems with the legs installed at improper angles thereby limiting the ability of the support systems to adequately withstand stresses experienced in high wind conditions.

The background art reveals a number of systems have been developed to advance the art of tree support systems. For example, U.S. Pat. No. 6,612,071, issued to Stedman, discloses a tree support apparatus comprising a plurality of brackets interconnected by ties, engageable around a tree, and ground engaging 2×4 members extending from each bracket. U.S. Pat. No. 8,407,934, issued to Solares, discloses a tree planting support system including a housing assembly, band clamps, and a stake assembly. The housing includes an angled cavity for receiving the end of a support post therein. The housing mounts onto a tree trunk to stabilize a recently planted tree in a substantially vertical position until its root system can take hold.

The systems disclosed by Stedman and Solares rely on straps to maintain support structures and brackets to the tree trunk with straps positioned so close to the trunk that they are likely to damage the tree by scrapping or becoming embedded within the tree bark as the tree grows. Accordingly, there exists a need for further advancements in the art of support systems for newly planted trees.

BRIEF SUMMARY OF THE INVENTION

The present invention overcomes the limitations and disadvantages present in the art by providing an improved tree support system and method for temporarily supporting a tree that is easy to install and remove, and does not impart damage to the tree. A primary aspect of the present invention involves providing a plurality of one-piece molded support blocks which are designed to be strapped to the trunk of a tree such that pluralities of said blocks encircle the trunk. Each support block is specifically configured to avoid causing damage to the tree by including a padded tree-engaging surface to protect the tree from damage, and a pair of strap-receiving loops which are disposed on the block so as to be spaced from the tree trunk such that securing straps are maintained in spaced relation from the tree trunk. The support blocks further include an angled cavity having a generally rectangular cross-section sized for receiving a wooden support post or leg, such as a 2×4, thereby ensuring proper angled positioning of the support posts. In a preferred embodiment, the support blocks are injection molded from a suitable injection molding material that is colored safety orange to provide high visibility.

Accordingly, it is an object of the present invention to provide advancements in the art of tree support devices.

It is another object of the present invention to provide a tree support system that is quickly and easily installed thereby resulting in efficient planting operations.

Yet another object of the present invention is to provide a tree support system that avoids ineffective installation by ensuring that the tree support legs are installed at an optimum angle.

In accordance with these and other objects, which will become apparent hereinafter, the instant invention will now be described with particular reference to the accompanying drawings.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
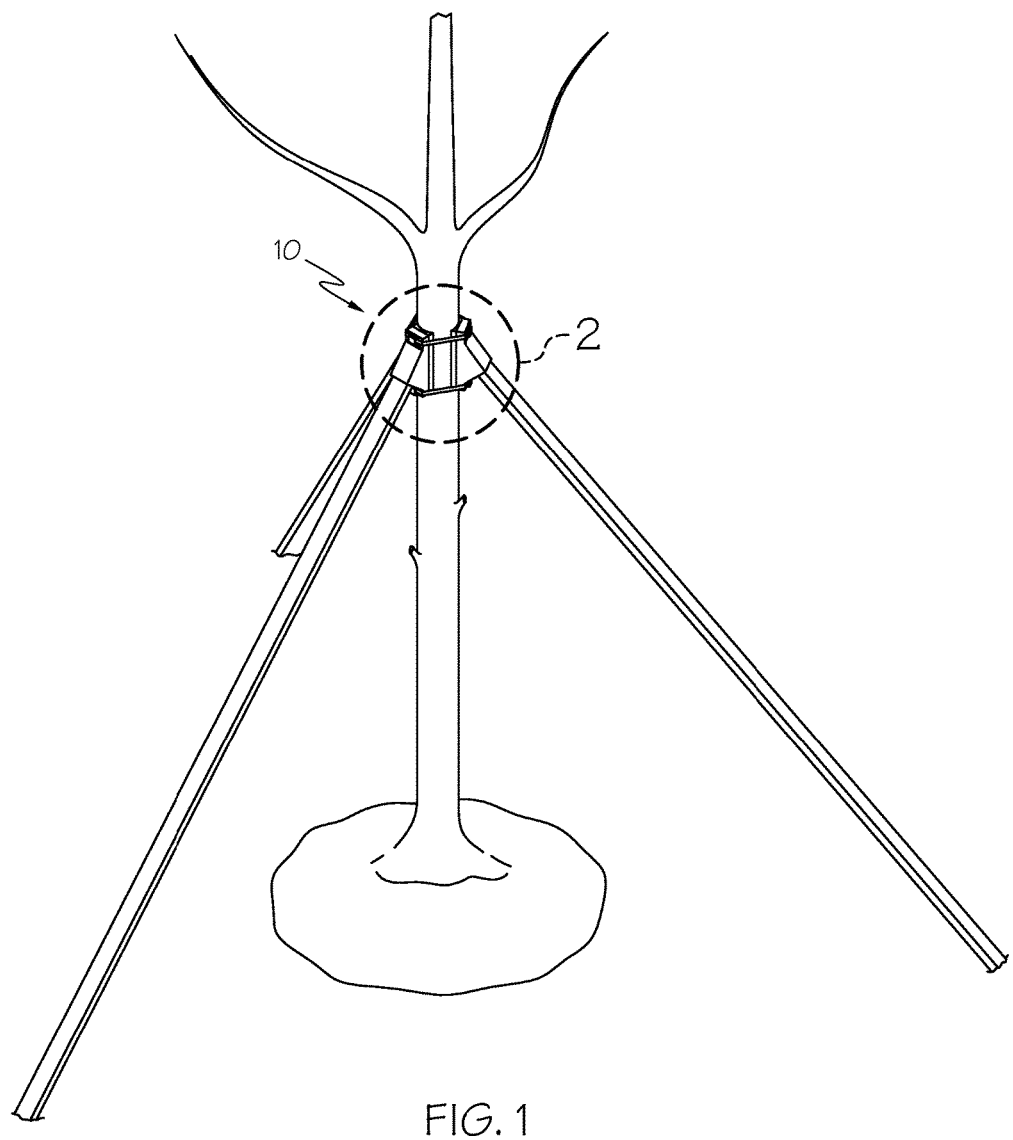
FIG. 1 illustrates a tree support system in accordance with the present invention installed in operative supporting engagement with a tree.
Figure 2:
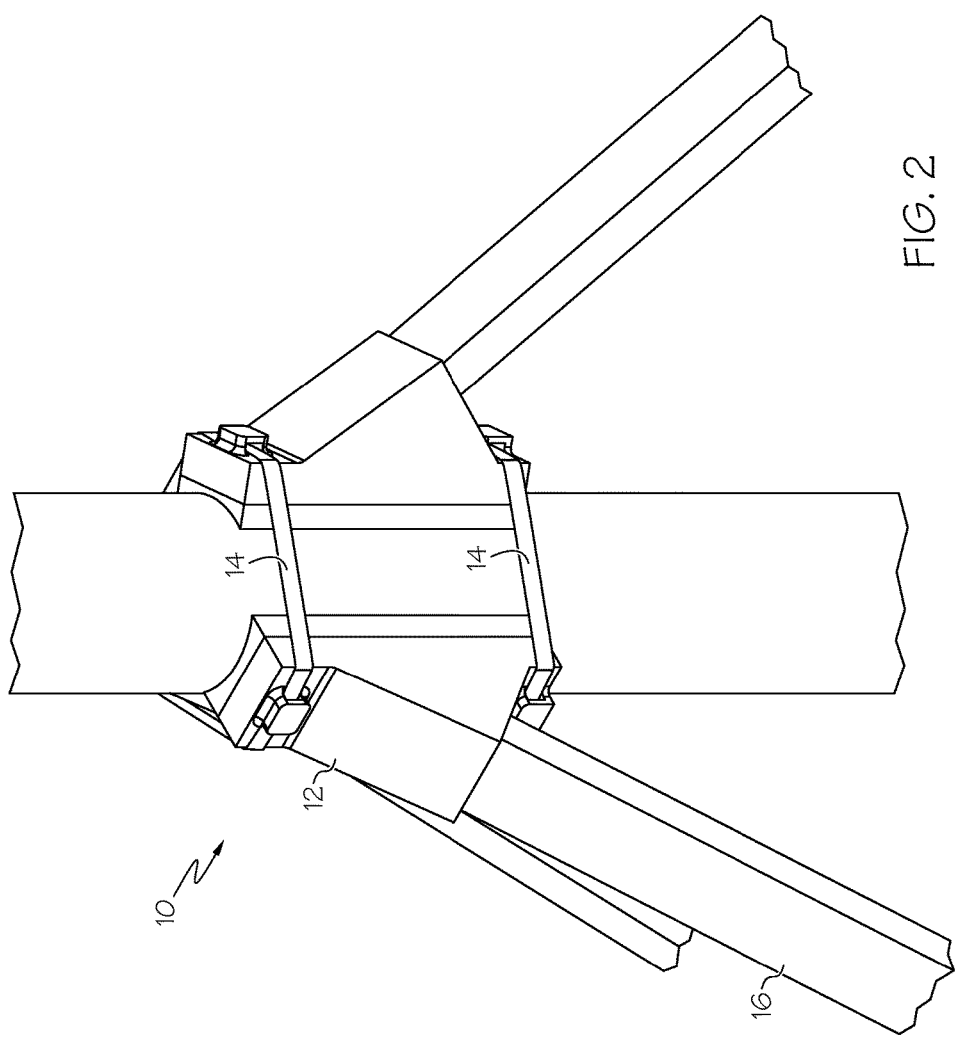
FIG. 2 is a partial detail view of the circular area identified as 2 in FIG. 1.
Figure 3:
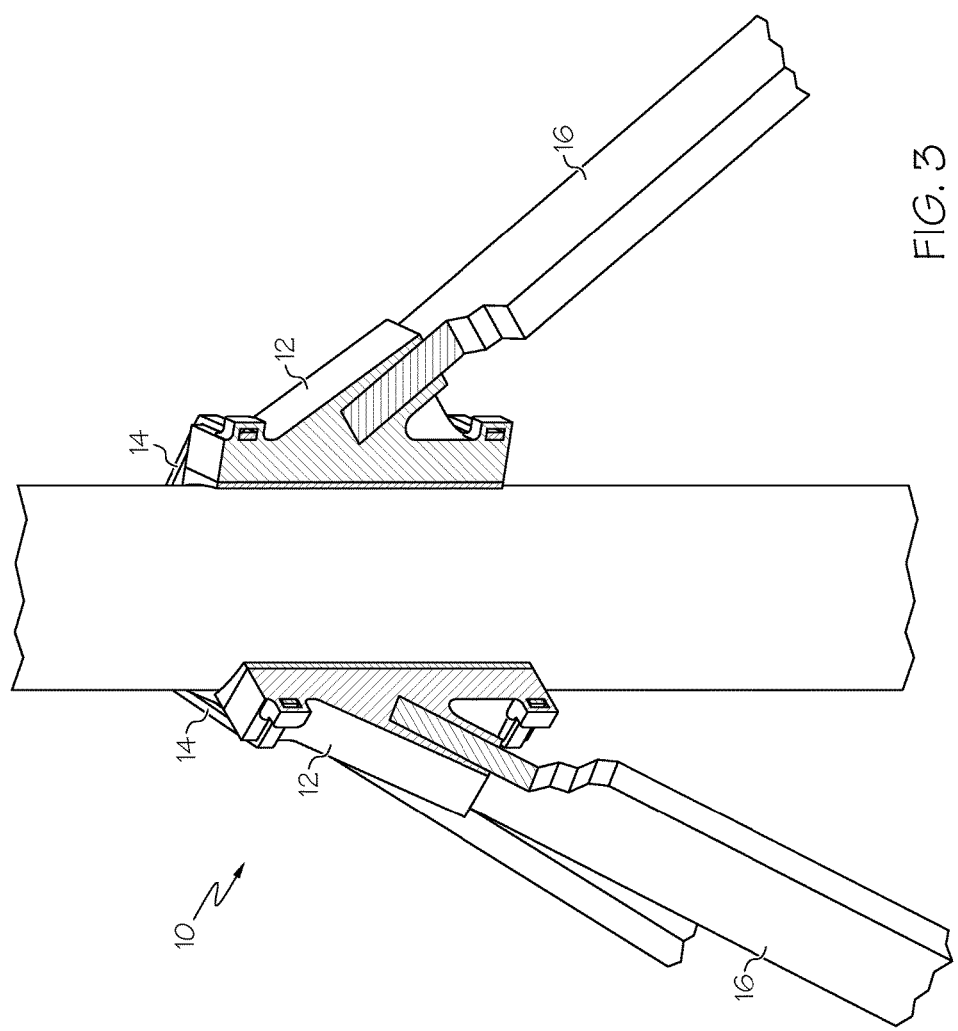
FIG. 3 is a quarter sectional view thereof.
Figure 4:
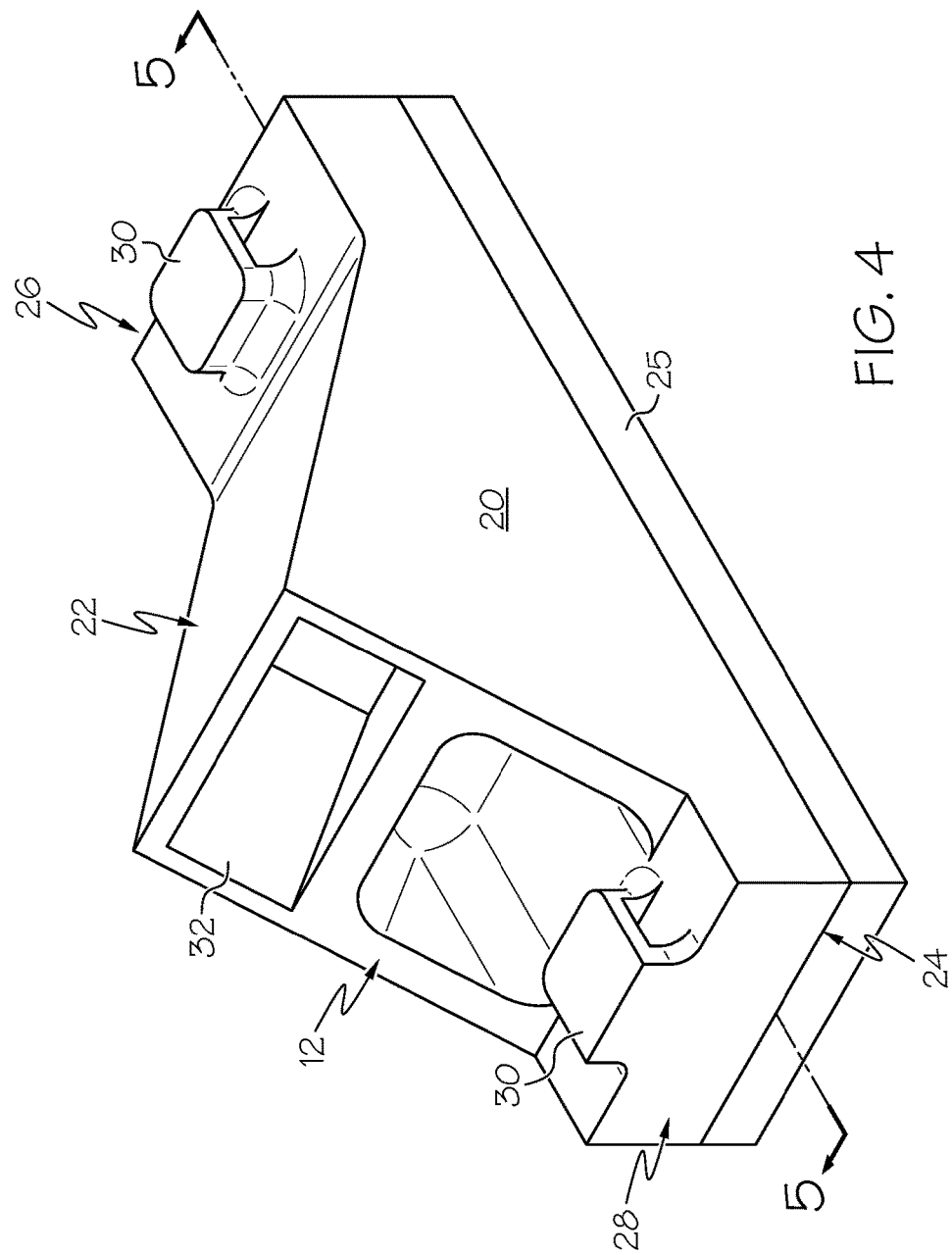
FIG. 4 is a perspective view of a tree support block in accordance with the present invention.
Figure 5:
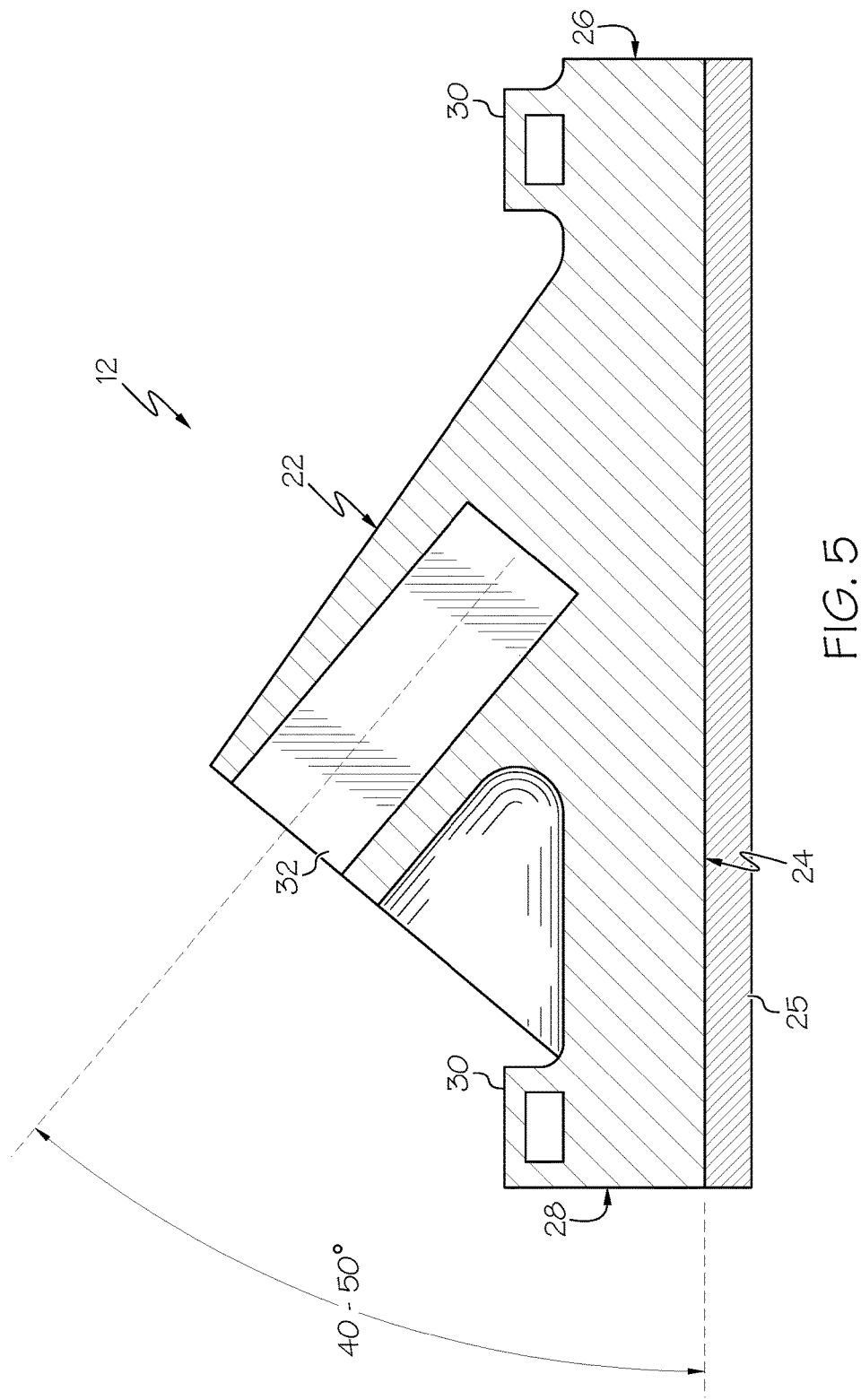
FIG. 5 is a sectional view thereof taken along line 5-5 of FIG. 4.
Figure 6:
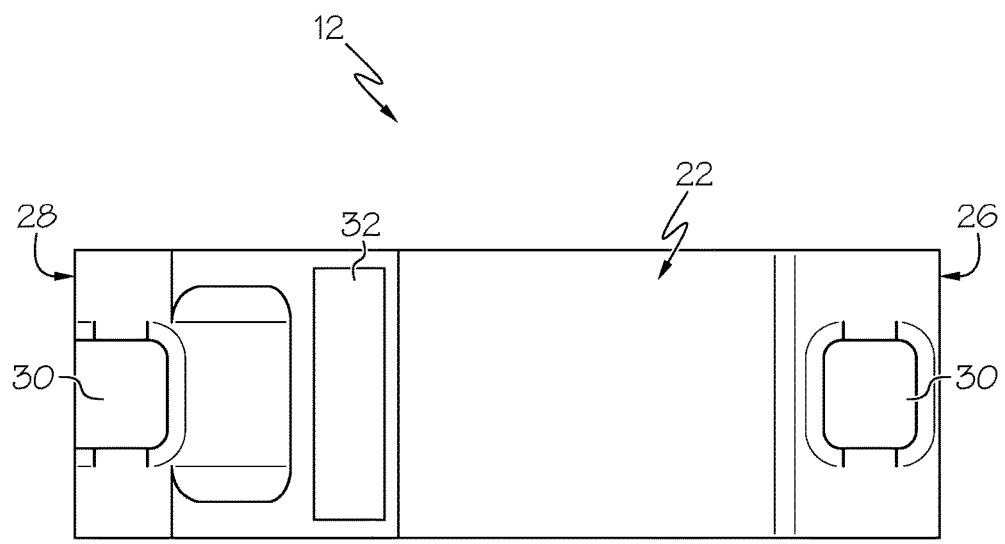
FIG. 6 is a front view thereof.
Figure 7:
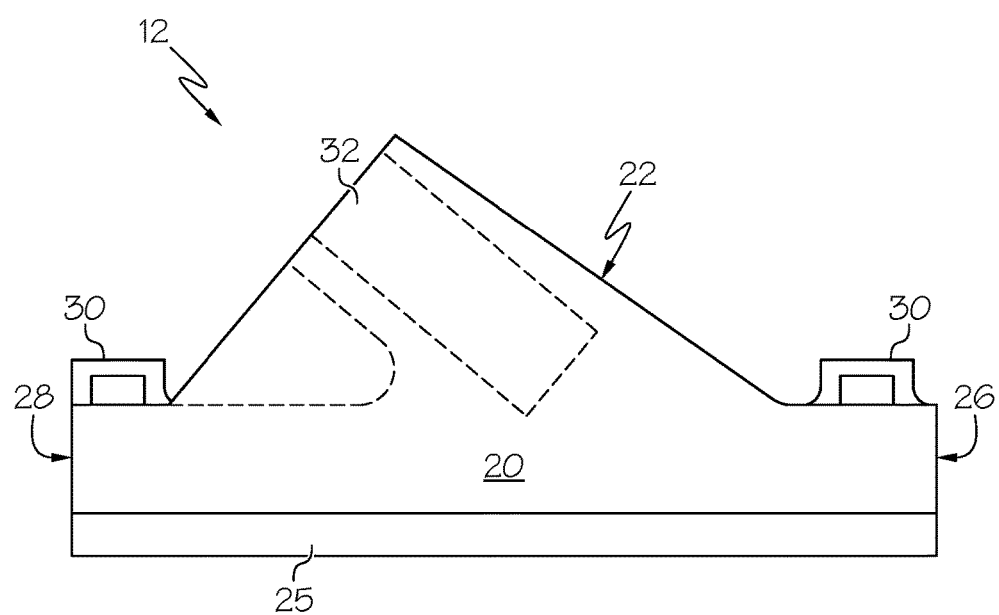
FIG. 7 is a side view thereof.
Figure 8:
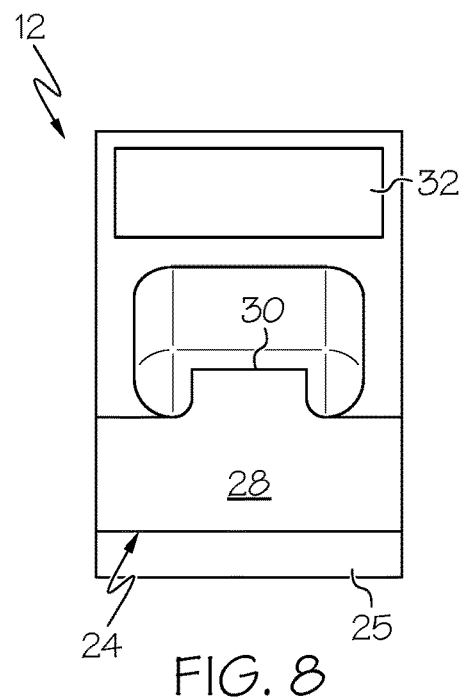
FIG. 8 is a bottom end view thereof.
Figure 9:
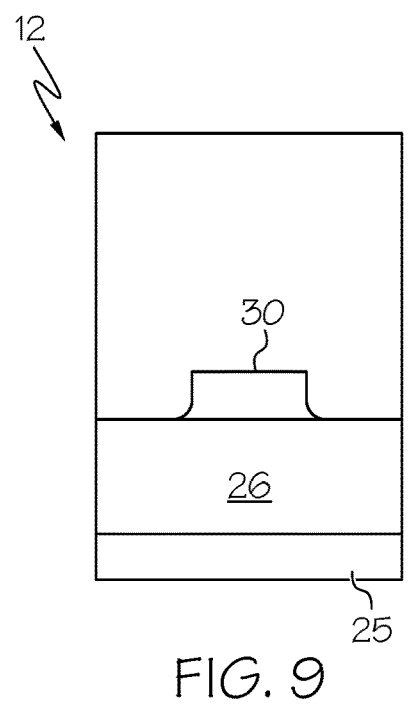
FIG. 9 is a top end view thereof.

Turning now to the drawings, FIGS. 1-9 depict tree support system, generally referenced as 10, in accordance with the present invention for temporarily supporting a tree that is easy to install and remove, and does not impart damage to the tree. Tree support system 10 includes a support block, generally referenced as 12, which is designed to be strapped around the circumference of the trunk of a tree along with a plurality of other support blocks such that the blocks encircle the trunk in angularly spaced relation. As best illustrated in FIGS. 1-3, support system 10 functions to prop up a newly planted tree to allow time for the root system to take hold of the surrounding soil sufficiently to withstand high wind conditions. A plurality of support blocks 12 are attached to the tree and secured by straps 14. A support leg 16 extends angularly downward from each block 12 with the terminal end thereof engaging the ground.

As best seen in FIGS. 4-9, each support block includes a rigid main body 20 that preferably comprises a one-piece injection molded body formed of a suitable plastic. In a preferred embodiment the support block is colored "safety orange" for high visibility. As should be apparent, however, any suitable color is considered within the scope of the present invention. Each support block 12 includes a front 22, a back 24, a top end 26, and a bottom end 28. In a preferred embodiment, the back 24 of support block 12 is substantially planar, however, in an alternate embodiment bottom 28 may be concave. The back 24 of support block 12 is adapted with cushion material 25 affixed thereto which is intended for abutting engagement with the tree. Cushion material 25 forms a protective layer between the back 24 of block 12 and the tree to prevent damage to the tree from movement between block 12 and the tree. Cushion material preferably comprises burlap, fabric, foam, or other suitable resilient material that functions as a scratch/scrape preventing buffer between the support block and the tree.

Support block 12 further includes a pair of strap-receiving loops 30 projecting from the font 22 thereof in proximity to the top and bottom ends 26 and 28 respectively. More particularly, a first strap-receiving loop, referenced as 30 is disposed in proximity to the top of block 12 and a second strap-receiving loop, also referenced as 30, is disposed in proximity to the bottom of block 12. A significant aspect of the present invention relates to providing block 12 with a thickness of between approximately 1.0"-2.0" at least in the area of the opposing top and bottom ends, 26 and 28 respectively, such that straps received within loops 30 are maintained in sufficiently spaced relation from the tree to prevent the strap causing damage to the tree. Using the block thickness to space the straps from the tree significantly reduces the risk that the straps will damage the tree by scraping bark etc. Support block 12 further defines an angled cavity 32 having a generally rectangular cross-section sized for receiving a wooden support post or leg, such as a 2×4. Cavity 32 is formed about a longitudinal axis which is preferably angled between approximately 40°-50° relative to the front and back surfaces thereby ensuring proper angled positioning of the support posts. As should be apparent, a support post insertedly received within cavity 32 will thus project angularly downward and away from the tree in optimum angular relation to provide maximum support.

Figure 10:
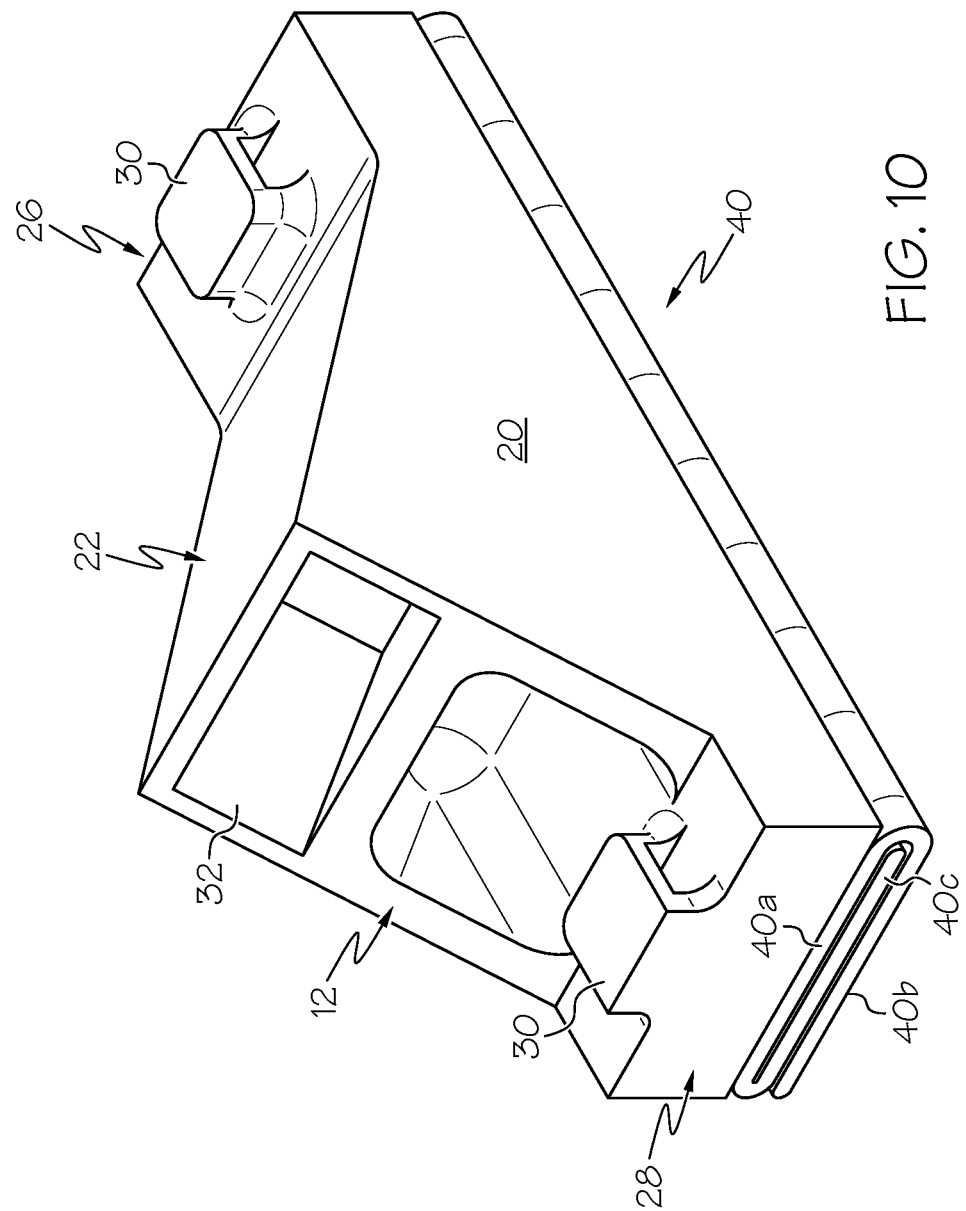
FIG. 10 is a perspective view of an alternate embodiment tree support block having a laterally deployable e tree protecting cushion.
Figure 11:
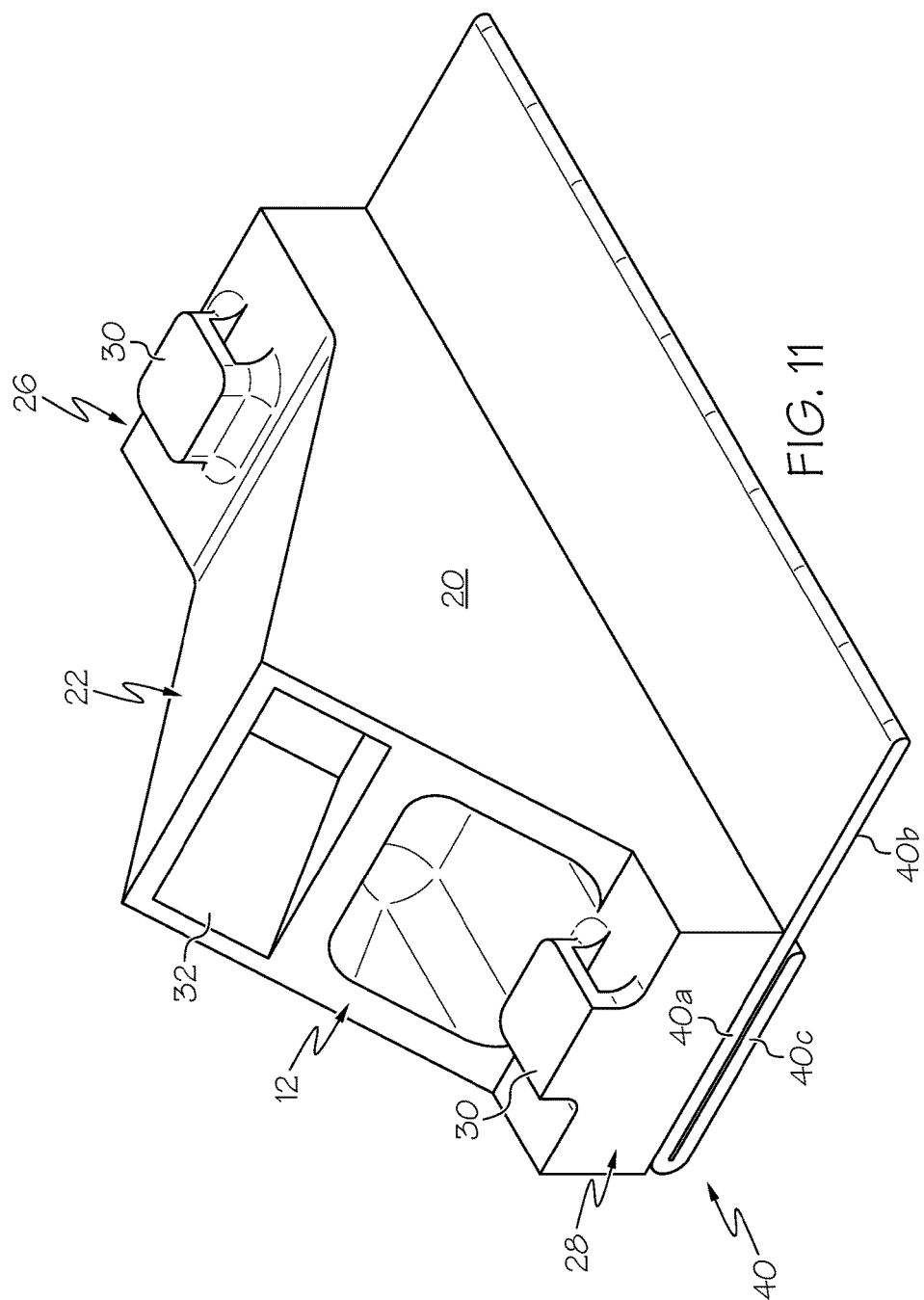
FIG. 11 is a perspective view thereof with a first lateral cushion arm deployed.
Figure 12:
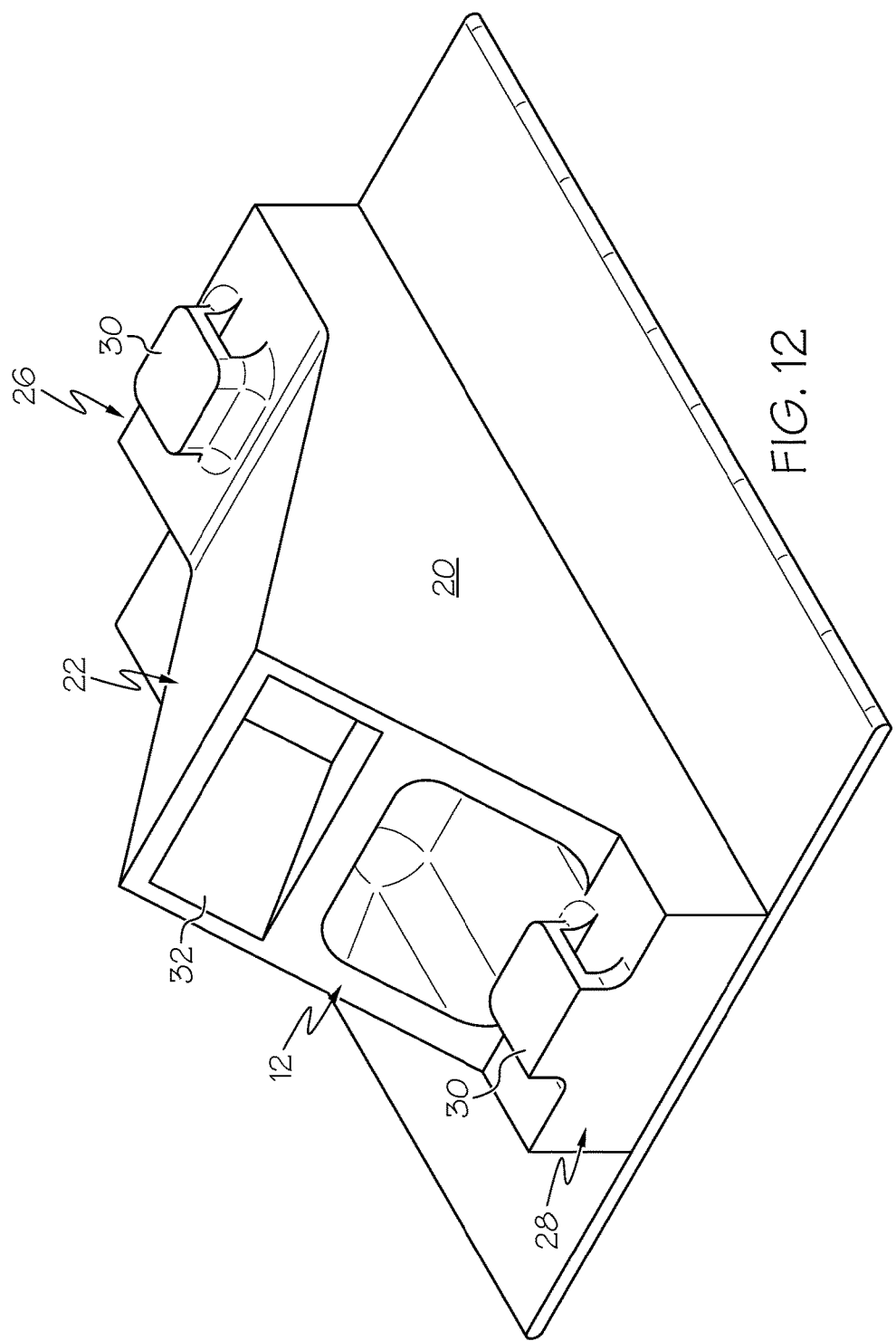
FIG. 12 is a perspective view thereof with both first and second lateral cushion arms deployed.
Figure 13:
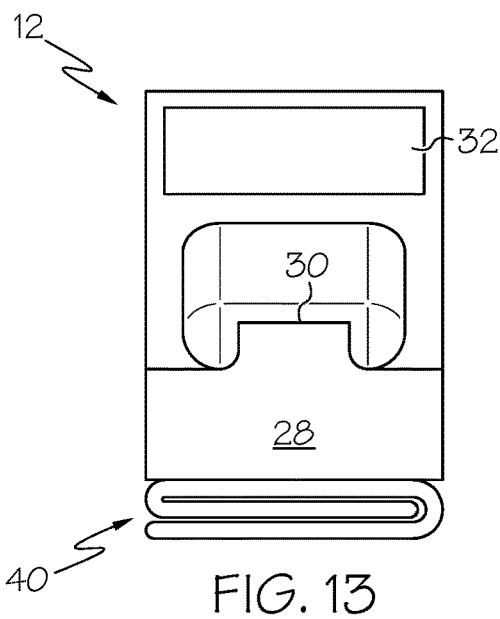
FIG. 13 is an end view of alternate embodiment tree support block illustrated in FIG. 10.
Figure 14:
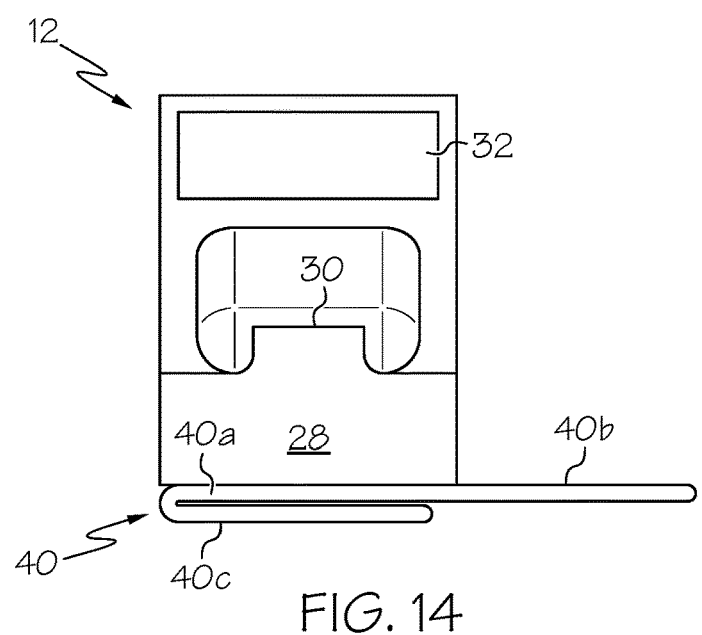
FIG. 14 is an end view thereof with a first lateral cushion arm deployed.
Figure 15:
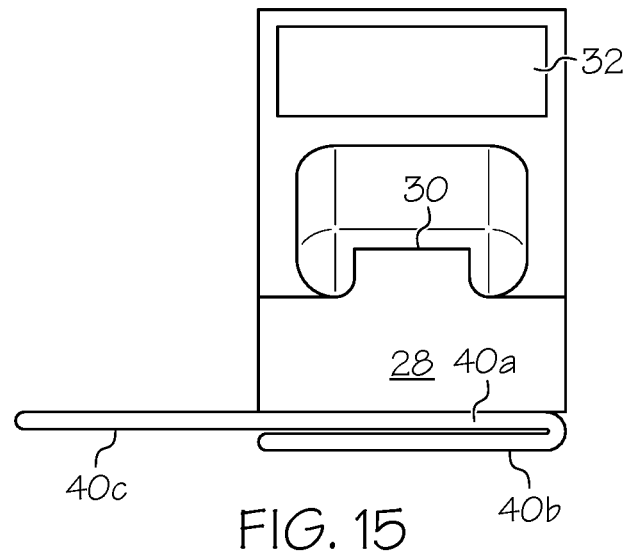
FIG. 15 is an end view thereof with a second lateral cushion arm deployed.
Figure 16:
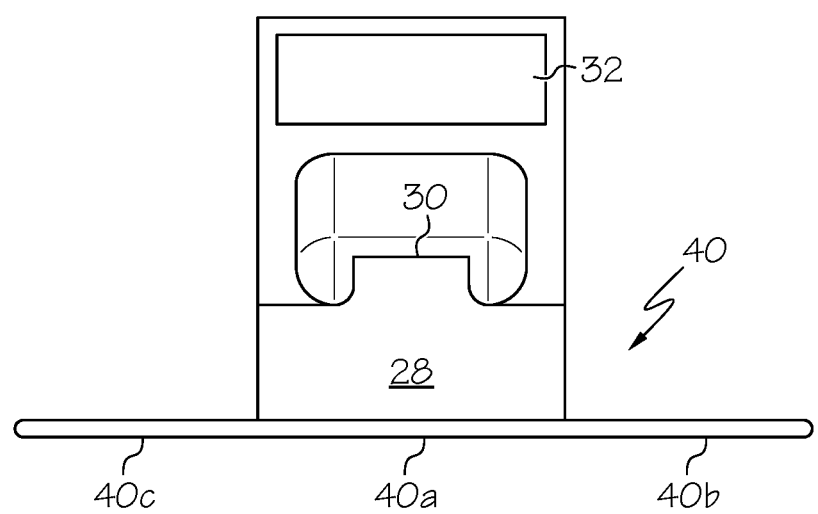
FIG. 16 is an end view thereof with both the first and second lateral cushion arms deployed.

As noted above, a significant problem with tree support blocks of the background art involves the damage caused to the tree bark from the securing straps. The first embodiment tree support block 10 disclosed above address that issue by maximizing the spacing between the securing straps and the tree. FIGS. 10-16 depict an alternate embodiment wherein support block 12 is adapted with an alternate cushion structure, generally referenced as 40, which significantly expands the range of protection for the tree. Cushion 40 is characterized as a tri-fold cushion structure having a central portion 40a, and laterally deployable cushion arms 40b and 40c foldably connected to opposing sides of central portion 40a. Central portion 40a and arms 40b and 40c may form an integral structure or maybe separate but joined components. FIG. 10 illustrates a perspective view of support block 12 adapted with the tri-fold cushion 40 configured in a fully folded configuration which maximizes localized cushion thickness. FIG. 11 illustrates a perspective view of support block 12 with cushion 40 configured with a first cushion arm 40b laterally deployed. As should be apparent, cushion arm 40a may alternately be laterally deployed while cushion 40b remains in a folded configuration. FIG. 12 illustrates a perspective view of support block 12 with cushion 40 configured with both the first and second cushion arms 40b and 40c laterally deployed. FIGS. 13-16 are end view illustrations showing the various folded/deployed configurations made available by the use of a tri-fold cushion structure in accordance with the present invention.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A tree support system comprising:
   a plurality of support blocks, each block having a front, a planar back surface, a top end, and a bottom end;
   a pair of strap-receiving loops projecting from the front of each support block, including a first loop disposed in proximity to said top end and a second loop disposed in proximity to said bottom end;

each support block defining a cavity having a generally rectangular cross-section, said cavity formed about a longitudinal axis disposed between approximately 40°-50° relative to said back surface;

said back surface having cushion material affixed thereto, said cushion material having a central portion affixed to the back of said support block and a pair of laterally deployable cushion arms foldably connected to opposing sides of said central portion, said laterally deployable cushion arms providing additional laterally projecting protection for the tree.

2. The tree support system according to claim 1, wherein said cushion material is configurable between a fully folded tri-fold configuration wherein said cushion arms are disposed in overlapping relation with said central portion, and a deployed configuration wherein one or both of said cushion arms are unfolded to a laterally projecting configuration.

3. The tree support system according to claim 1, wherein said cushion material is selected from the group consisting of: burlap, fabric, and foam.

4. The tree support system according to claim 1, wherein said support block is formed from injection molded material.

5. The tree support system according to claim 1, wherein said support block is orange in color.

6. A tree support system comprising:

an injection molded support block having a front, a planar back, a top end, and a bottom end, said front and back being spaced at least 1.0" at said top and bottom ends;

said back having cushion material affixed thereto, said cushion material including a pair of opposing laterally deployable cushion arms foldably connected to opposing sides of a central portion, said central cushion portion affixed to the back of said support block, said cushion material configurable from a fully folded configuration wherein one of said pair of opposing laterally deployable cushion arms is sandwiched between said central cushion portion and the other of said laterally deployable cushion arm thereby providing maximum local cushion thickness between said back surface and the tree, to a deployed configuration wherein said laterally deployable cushion arms are unfolded so as to project from opposing sides of said central portion to provide additional laterally projecting protection for the tree;

a pair of strap-receiving loops projecting from the front of said support block, said strap-receiving loops including a first loop disposed in proximity to said top end and a second loop disposed in proximity to said bottom end;

a cavity having a generally rectangular cross-section and an opening disposed on the front side of said support block, said cavity formed about a longitudinal axis disposed between approximately 40°-50° relative to the said back surface;

whereby a plurality of support blocks are affixed in surrounding angularly spaced relation about a tree trunk, secured by first and second straps received in corresponding first and second loops and maintained in spaced relation from the tree trunk, with support legs received within corresponding cavities angularly extending radially outward and downward to ground engagement.

7. The tree support system according to claim 6, wherein said cushion material is selected from the group consisting of: burlap, fabric, and foam.

8. The tree support system according to claim 6, wherein said support block is formed from injection molded material.

9. The tree support system according to claim 6, wherein said support block is orange in color.

* * * * *